(12) United States Patent
Yoshimura et al.

(10) Patent No.: US 11,077,859 B2
(45) Date of Patent: Aug. 3, 2021

(54) STATE DETERMINATION DEVICE, STATE DETERMINATION PROGRAM, AND COMPUTER-READABLE NON-TRANSITORY TANGIBLE STORAGE MEDIUM

(71) Applicant: DENSO CORPORATION, Kariya (JP)

(72) Inventors: Yukiyasu Yoshimura, Kariya (JP); Hiroshi Morimoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/026,059

(22) Filed: Sep. 18, 2020

(65) Prior Publication Data
US 2021/0001866 A1 Jan. 7, 2021

Related U.S. Application Data

(63) Continuation of application No. PCT/JP2019/007188, filed on Feb. 26, 2019.

(30) Foreign Application Priority Data

Mar. 23, 2018 (JP) .............................. JP2018-056139

(51) Int. Cl.
*B60W 40/09* (2012.01)
*G06K 9/00* (2006.01)
(Continued)

(52) U.S. Cl.
CPC ......... *B60W 40/09* (2013.01); *G06K 9/00845* (2013.01); *G06K 9/6292* (2013.01);
(Continued)

(58) Field of Classification Search
CPC .......... B60W 40/09; B60W 2540/225; B60W 2540/223; B60W 2540/221;
(Continued)

(56) References Cited

U.S. PATENT DOCUMENTS 9,081,650 B1 * 7/2015 Brinkmann .......... G07C 5/0808
9,147,353 B1 * 9/2015 Slusar .................... G06Q 40/08
(Continued)

FOREIGN PATENT DOCUMENTS

| JP | H11227491 A | 8/1999 |
|---|---|---|
| JP | 2005173635 A | 6/2005 |

(Continued)

*Primary Examiner* — Ryan W Sherwin
(74) *Attorney, Agent, or Firm* — Harness, Dickey & Pierce, P.L.C.

(57) ABSTRACT

A state determination device to determine that a driver driving a vehicle is in a driving difficult state detects an abnormality in a state of the driver, and detects at least one of an abnormality in a driving operation input by the driver or an abnormality in a traveling state of the vehicle. In response to detecting the abnormality in the state of the driver alone, the state determination device does not determine that the driver is in the driving difficult state but determines that the driver is in the driving difficult state in response to detecting the abnormality in the state of the driver and additionally detecting the at least one of the abnormality in the driving operation input by the driver or the abnormality in the traveling state of the vehicle.

9 Claims, 7 Drawing Sheets

(51) Int. Cl.
*G06K 9/62* (2006.01)
*B60W 40/08* (2012.01)
(52) U.S. Cl.
CPC ............... *B60W 2040/0818* (2013.01); *B60W 2040/0872* (2013.01); *B60W 2540/221* (2020.02); *B60W 2540/223* (2020.02); *B60W 2540/225* (2020.02)
(58) Field of Classification Search
CPC . B60W 2040/0818; B60W 2040/0872; B60W 40/08; G06K 9/00845; G06K 9/6292; G06K 9/00335; G06K 9/00221; G06K 9/6293
See application file for complete search history.

(56) References Cited

U.S. PATENT DOCUMENTS

| | | | |
|---|---|---|---|
| 9,919,648 B1* | 3/2018 | Pedersen | G08G 1/048 |
| 2012/0212353 A1* | 8/2012 | Fung | B60W 30/08 |
| | | | 340/905 |
| 2015/0314681 A1* | 11/2015 | Riley, Sr. | G08B 21/06 |
| | | | 340/576 |
| 2017/0158054 A1 | 6/2017 | Munaoka et al. | |
| 2017/0161576 A1 | 6/2017 | Banno et al. | |
| 2017/0235306 A1* | 8/2017 | Seki | B60W 40/08 |
| | | | 701/23 |
| 2017/0297567 A1* | 10/2017 | Matsumura | B60W 40/08 |
| 2018/0037216 A1* | 2/2018 | Otake | B60W 30/18109 |
| 2018/0042486 A1 | 2/2018 | Yoshizawa et al. | |
| 2018/0233038 A1* | 8/2018 | Kozloski | G06K 9/00637 |

FOREIGN PATENT DOCUMENTS

| | | |
|---|---|---|
| JP | 2005301832 A | 10/2005 |
| JP | 2009175929 A | 8/2009 |
| JP | 2010224770 A | 10/2010 |
| JP | 2016009258 A | 1/2016 |
| JP | 2016027452 A | 2/2016 |
| JP | 2016045713 A | 4/2016 |
| JP | 5919150 B2 | 5/2016 |
| JP | 6024639 B2 | 11/2016 |
| JP | 2016190022 A | 11/2016 |
| JP | 2017107299 A | 6/2017 |
| JP | 2017146788 A | 8/2017 |
| JP | 2019105872 A | 6/2019 |

* cited by examiner

| DRIVING OPERATION ABNORMAL ITEMS | DRIVER ABNORMAL ITEMS | | | | | |
|---|---|---|---|---|---|---|
| | FORWARD FALL POSTURE DETECT | LATERAL FALL POSTURE DETECT | RIGIDITY POSTURE DETECT | WHITE EYE DETECT | PULSE WAVE ABNORMAL DETECT | STEERING NON-GRIP DETECT |
| STEERING WOBBLY INPUT DETECT | × | × | × | × | × | ○ |
| STEERING INPUT FORCE DROP DETECT | ○ | ○ | ○ | ○ | ○ | ○ |
| BRAKE INPUT ABNORMAL DETECT | × | × | ○ | × | × | × |
| VISUAL FIXATION DETECT | × | ○ | ○ | × | ○ | × |
| ACCEL INPUT ABNORMAL DETECT | ○ | × | ○ | ○ | × | × |
| ACCEL/BRAKE INPUT FORCE DROP DETECT | ○ | ○ | ○ | ○ | ○ | × |

○ : RELEVANT   × : IRRELEVANT

FIG. 4

| Vehicle State Abnormal Items | Steering Wobbly Input Detect | Steering Input Force Drop Detect | Brake Input Abnormal Detect | Visual Fixation Detect | Accel Input Abnormal Detect | Accel/Brake Input Force Drop Detect |
|---|---|---|---|---|---|---|
| Vehicle Heading Swing Detect | X | X | O | X | O | O |
| Short V2V Distance Continuous Detect (V2V Alert ECU) | X | X | X | O | O | X |
| Lane Marker Crossing Detect (Lane Depart Alert ECU) | O | O | X | O | X | X |
| Long Time Over-Speed Detect | X | X | X | X | O | O |
| Abnormal Low Speed Detect in Highway | X | X | X | X | X | O |
| Collision Detect | O | O | X | O | O | X |

Driving Operation Abnormal Items

O : Relevant   X : Irrelevant

STATE DETERMINATION DEVICE, STATE DETERMINATION PROGRAM, AND COMPUTER-READABLE NON-TRANSITORY TANGIBLE STORAGE MEDIUM

CROSS-REFERENCE OF RELATED APPLICATIONS

This application is a continuation application of PCT/JP2019/007188 filed on Feb. 26, 2019, which designated the U.S. and claims the benefit of priority from Japanese Patent Application No. 2018-56139 filed on Mar. 23, 2018. The entire disclosures of all of the above applications are incorporated herein by reference.

TECHNICAL FIELD

The present disclosure relates to a state determination technology to determine a driving difficulty state of a driver.

BACKGROUND

For example, there is a driving support device that performs driving support such as automated deceleration or automated stop of a vehicle in response to a driver falling into a driving difficult state.

SUMMARY

As an example, the present disclosure provides a state determination device to determine that a driver who is driving a vehicle is in a driving difficult state. The state determination device detects an abnormality in a state of the driver, and; detects at least one of: an abnormality in a driving operation input by the driver; or an abnormality in a traveling state of the vehicle. In response to only the driver abnormality detection unit detecting the abnormality in the state of the driver alone, the state determination device does not determine that the driver is in the driving difficult state. The state determination device determines that the driver is in the driving difficult state in response to detecting the abnormality in the state of the driver and additionally detecting the at least one of the abnormality in the driving operation input by the driver or the abnormality in the traveling state of the vehicle.

As another example, the present disclosure provides a state determination method performed by at least one processing unit to determine that a driver who is driving a vehicle is in a driving difficult state, the method comprising: detecting an abnormality in a state of the driver; detecting at least one of: an abnormality in a driving operation input by the driver; or an abnormality in the traveling state of the vehicle; and in response to only the abnormality in the state of the driver alone, not determining that the driver is in the driving difficult state but determining that the driver is in the driving difficult state in response to detecting the abnormality in the state of the driver and additionally detecting the at least one of: the abnormality in the driving operation input by the driver; or the abnormality in the traveling state of the vehicle.

As another example, the present disclosure provides a computer readable non-transitory storage medium comprising computer-executable instructions that comprise a computer-implemented method of determining that a driver who is driving a vehicle is in a driving difficult state, the method comprising: detecting an abnormality in a state of the driver; detecting at least one of: an abnormality in a driving operation input by the driver; or an abnormality in a traveling state of the vehicle; and determining that the driver is in the driving difficult state in response to detecting the abnormality in the state of the driver and additionally detecting the at least one of the abnormality in the driving operation input by the driver or the abnormality in the traveling state of the vehicle, while in response to detecting the abnormality in the state of the driver alone, it is not determined that the driver is in the driving difficult state.

BRIEF DESCRIPTION OF DRAWINGS

Objects, features and advantages of the present disclosure will become more apparent from the following detailed description made with reference to the accompanying drawings. In the drawings.

DETAILED DESCRIPTION

There is a driving support device that performs driving support such as automated deceleration or automated stop of a vehicle in response to a driver falling into a driving difficult state. In this technology, a driving posture, a heartbeat state, a breathing state, or the like is grasped for the driver's state by a driver state detection sensor. Then, a state determination unit being a functional element of a vehicle ECU determines whether or not the driver is in a driving difficult state, based on information transmitted from the driver state detection sensor.

A determination result indicating that the driver is in a driving difficult state is used as a trigger of whether to start an emergency operation such as automated deceleration and automated stop. Therefore, it is hardly to tolerate erroneous detection of the driving difficult state. In this regard however, if the posture collapse or the like occurs in the driver in a normal state for example, it may be erroneously determined that the driver is in the driving difficult state based on such a change in the driving posture.

It is an object of the present disclosure to provide a state determination device, a state determination program, and a computer-readable non-transitory tangible storage medium capable of reducing erroneous detection of a driving difficulty state of a driver.

In a first aspect of the present disclosure, a state determination device to determine that a driver who is driving a vehicle is in a driving difficult state comprises: a driver abnormality detection unit that detects an abnormality in a state of the driver; a complementary abnormality detection unit that detects at least one of: an abnormality in a driving operation input by the driver; or an abnormality in a traveling state of the vehicle; and an integrated determination unit that, in response to the driver abnormality detection unit detecting the abnormality in the state of the driver alone, does not determine that the driver is in the driving difficult state but determines that the driver is in the driving difficult state in response to the driver abnormality detection unit detecting the abnormality in the state of the driver and additionally the complementary abnormality detection unit detecting the at least one of the abnormality in the driving operation input by the driver or the abnormality in the traveling state of the vehicle, The integrated determination unit of the above aspect does not determine that the driver is in a driving difficult state, in response to only detecting the abnormality in the state of the driver alone. In response to, in addition to detecting such an abnormality in the state of the driver, also detecting at least one of the driving operation or and the traveling state, the integrated determination unit determines that the driver is in the driving difficult state. According to the above, a situation in which a posture collapse or the like of the driver a normal state is confused with a driving difficulty state is unlikely to occur. Therefore, it is possible to reduce erroneous detection of the driver's driving difficulty.

In a second aspect of the present disclosure, a state determination program to determine that a driver who is driving a vehicle is in a driving difficult state causes at least one processing unit to function as: a driver abnormality detection unit that detects an abnormality in a state of the driver; a complementary abnormality detection unit that detects at least one of: an abnormality in a driving operation input by the driver; or an abnormality in the traveling state of the vehicle; and an integrated determination unit that, in response to the driver abnormality detection unit detecting the abnormality in the state of the driver alone, does not determine that the driver is in the driving difficult state but determines that the driver is in the driving difficult state in response to the driver abnormality detection unit detecting the abnormality in the state of the driver and additionally the complementary abnormality detection unit detecting the at least one of the abnormality in the driving operation input by the driver or the abnormality in the traveling state of the vehicle.

The integrated determination unit in the above aspect does not determine that the driver is in a driving difficult state, in response to only detecting the abnormality in the state of the driver alone. In response to, in addition to detecting such an abnormality in the state of the driver, also detecting at least one of the driving operation or and the traveling state, the integrated determination unit determines that the driver is in the driving difficult state. According to the above, a situation in which a posture collapse or the like of the driver a normal state is confused with a driving difficulty state is unlikely to occur. Therefore, it is possible to reduce erroneous detection of the driver's driving difficulty.

In a third aspect of the present disclosure, in a computer readable non-transitory storage medium comprising computer-executable instructions that comprise a computer-implemented method of determining that a driver who is driving a vehicle is in a driving difficult state, the method comprises: detecting an abnormality in a state of the driver; detecting at least one of: an abnormality in a driving operation input by the driver; or an abnormality in a traveling state of the vehicle; determining that the driver is in the driving difficult state in response to detecting the abnormality in the state of the driver and additionally detecting the at least one of the abnormality in the driving operation input by the driver or the abnormality in the traveling state of the vehicle, while in response to only detecting the abnormality in the state of the driver alone, it is not determined that the driver is in the driving difficult state.

In the computer-readable non-transitory storage medium of the above aspect, in response to only detecting the abnormality in the state in the driver alone, it is not determined that the driver is in a driving difficult state. It is determined that the driver is in the driving difficult state, in response to detecting the abnormality in the state of the driver and additionally detecting the at least one of the abnormality in the driving operation input by the driver or the abnormality in the traveling state of the vehicle. According to the above, a situation in which a posture collapse or the like of the driver a normal state is confused with a driving difficulty state is unlikely to occur. Therefore, it is possible to reduce erroneous detection of the driver's driving difficulty.

First Embodiment

Figure 1:
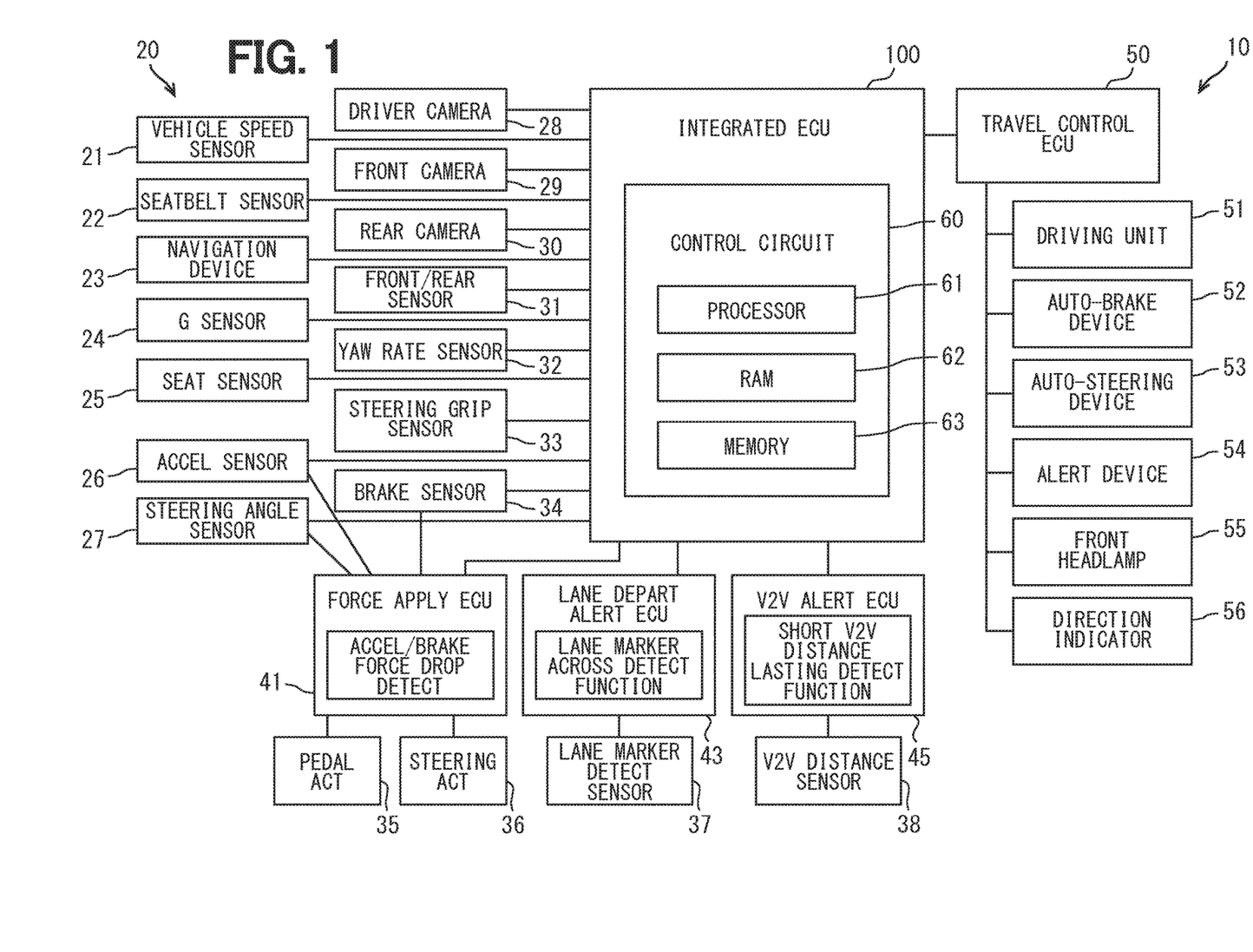
FIG. 1 is a block diagram illustrating an overall view of a driving support system mounted to a vehicle.
Figure 2:
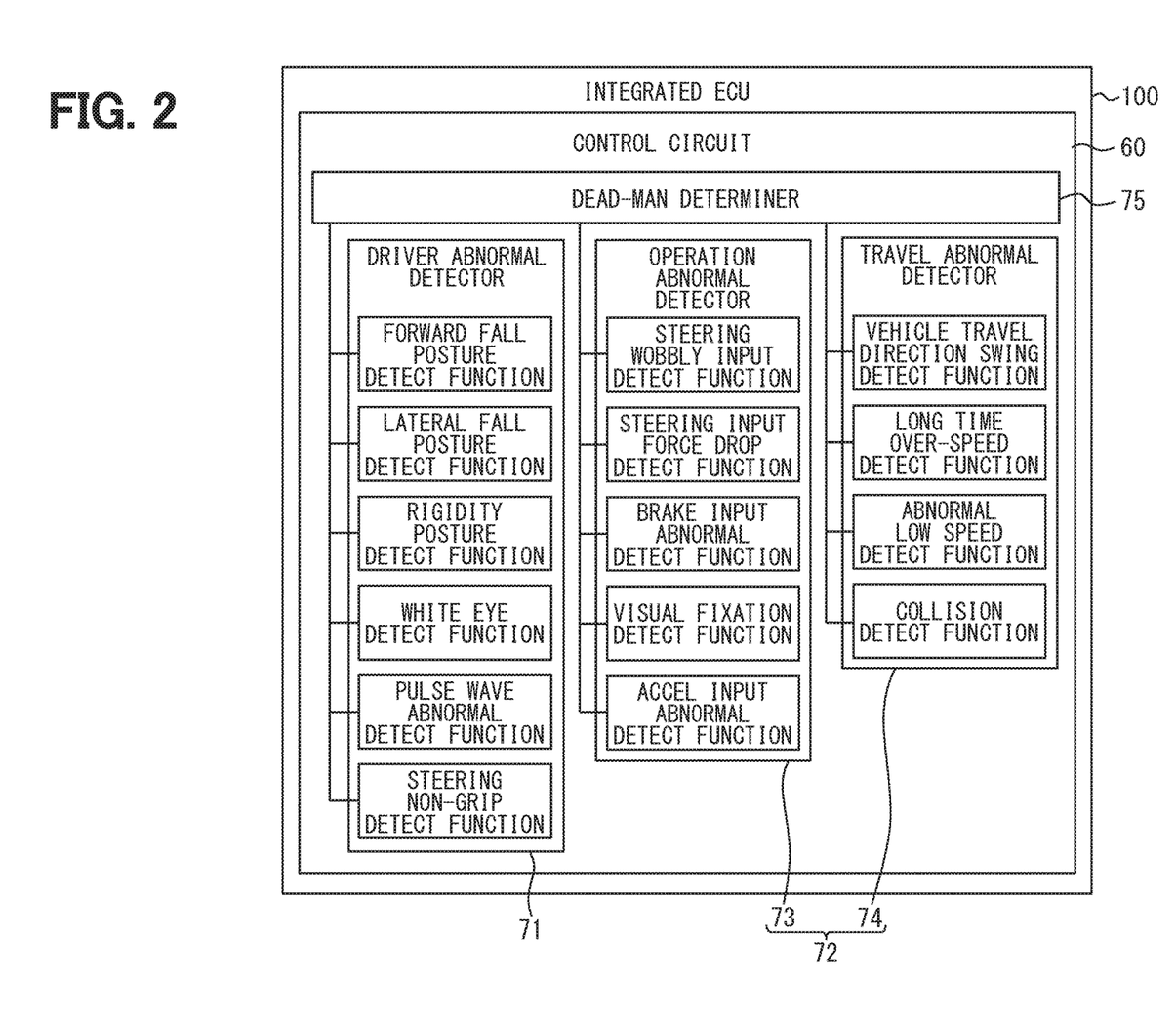
FIG. 2 is a diagram illustrating a number of functions implemented in an integrated ECU.

An integrated ECU 100 implements functions of a state determination device according to an embodiment of the present disclosure shown in FIGS. 1 and 2. The integrated ECU (Electronic Control Unit) 100 is a computing device that is used in a driving support system 10 mounted to a vehicle and is a core of the driving support system 10. The driving support system 10 operates as an abnormality response system of deceleration stop type when a driver falls into an abnormal physical condition and hardly continues driving.

The driving support system 10 estimates the driving difficulty state of the driver by the integrated ECU 100, and starts emergency travel. The driving difficult state of the driver is so-called a dead-man state, in which it is difficult to recover to a normal-driving performable state due to an unpredictable sudden change in physical condition. For example, the driver's inattentiveness and mindlessness do not correspond to the driving difficulty state (dead-man) to be detected, because these are not the sudden physical condition change. The driver's drowsiness may not correspond to the driving difficult state to be detected, because even if it is caused by a sudden change in physical condition, it may be possible to recover to the normal driving performable state.

The driving support system 10 includes a plurality of vehicle-mounted devices 20 electrically connected directly or indirectly to the integrated ECU 100. In addition, the driving support system 10 includes a force apply ECU 41, a lane departure alert ECU 43, a V2V alter ECU 45, a travel control ECU 50, and the like, together with the integrated ECU 100 described above.

The vehicle-mounted devices 20 include a vehicle speed sensor 21, a seat belt sensor 22, a navigation device 23, a G sensor 24, a seat sensor 25, an accelerator sensor 26, a steering angle sensor 27, and the like. Further, the vehicle-mounted devices 20 include a driver camera 28, a front camera 29, a rear camera 30, a front/rear sensor 31, a yaw rate sensor 32, a steering grip state sensor 33, a brake sensor 34, and the like.

The vehicle speed sensor 21 is a sensor that detects a rotation speed of a tire wheel as information corresponding to the speed of the vehicle. The seat belt sensor 22 is an encoder that detects a rotation angle of a motor that sends out and winds up a seat belt of a driver's seat. The navigation device 23 is configured to include a GNSS (Global Navigation Satellite System) receiver, a map database, and the like. The navigation device 23 specifies a current position of the vehicle based on positioning signals received by the GNSS receiver etc. The navigation device 23 provides the integrated ECU 100 with the current position of the vehicle and map data around the current position including a scheduled route of the vehicle.

The G sensor 24 is a sensor that detects accelerations acting on the vehicle. The seat sensor 25 is a sensor that detects pressure distribution on the seat surface of the driver's seat. The accelerator sensor 26 is a sensor that detects an amount of depression of an accelerator pedal (accelerator opening degree). The steering angle sensor 27 is a sensor that detects a steering direction and a steering amount (steering angle) of the steering.

The driver camera 28 includes a near-infrared light source and a near-infrared camera, and a control unit that controls these. The driver camera 28 is arranged, for example, to an upper surface of an instrument panel, with the near infrared camera facing the driver's seat. With the near infrared camera, the driver camera 28 captures an upper half of the body of the driver illuminated by the near infrared light source in order to monitor the driver's state. The driver camera 28 mainly captures a head portion above the driver's neck, and successively outputs the captured face images to the integrated ECU 100.

The front camera 29 is a camera that captures an area in a traveling direction (front) of the vehicle. The rear camera 30 is a camera that captures an area in rear of the vehicle. The front/rear sensor 31 is a millimeter wave radar, a Lidar, an ultrasonic sensor etc., and detects a distance to an object in front of or behind the vehicle. The yaw rate sensor 32 is a sensor that detects a yaw rate acting on the vehicle. The steering grip state sensor 33 is installed on a rim portion of a steering wheel and detects the driver's grip state of the steering wheel. The brake sensor 34 is a sensor that detects an amount of depression or an operation speed of an accelerator pedal.

The force apply ECU 41 is electrically connected to a pedal actuator 35 and a steering actuator 36 in addition to the accelerator sensor 26, the steering angle sensor 27, and the brake sensor 34. The pedal actuator 35 is provided to each of the accelerator pedal and the brake pedal, and can apply a force to a respective pedal. The steering actuator 36 can apply a reaction force to a steering shaft.

The force apply ECU 41 performs diagnosis of whether or not the driver can correctly perform a driving operation based on the driver's reaction to the force applied by the actuator 35, 36. In addition, the force apply ECU 41 has a function of detecting a decrease in operation forces to the accelerator pedal and the brake pedal as one of the diagnostic functions. A pedal operation force drop detection function detects a decrease in the pedal operation force based on deterioration of the driver's reaction to the force applied by the pedal actuator 35, such as an increase in operation delay and an excessive operation input. The force apply ECU 41 provides the integrated ECU 100 with the detection result obtained by the pedal operation force drop detection function.

The lane departure alert ECU 43 is an electronic control unit having a function of detecting lane marker straddling of the vehicle. The lane departure alert ECU 43 is electrically connected to a lane marker detection sensor 37 which detects a lane marker (lane line) partitioning a travel lane. The lane departure alert ECU 43 alerts the driver with a warning sound or a warning display in response to detection of such a vehicle behavior as lane marker straddling. In addition, the lane departure alert ECU 43 provides the integrated ECU 100 with the detection result of the lane marker straddling. The front camera 29 or the rear camera 30 may also serve as the lane marker detection sensor 37. Alternatively, the Lidar included in the front/rear sensor 31 may also serve as the lane marker detection sensor 37.

The V2V alert ECU 45 is an electronic control unit having a function of detecting continuation of short vehicle-to-vehicle distance. The V2V alert ECU 45 is electrically connected to the V2V distance sensor 38 which measures the vehicle-to-vehicle distance. The V2V alert ECU 45 alerts the driver with a warning sound or a warning display when the vehicle continues to travel in a state of being excessively close to a preceding vehicle. In addition, in response to detecting the continuation of the short vehicle-to-vehicle distance, the V2V alert ECU 45 provides the detection result to the integrated ECU 100. The front camera 29 or the front/rear sensor 31 may also serve as the V2V distance sensor 38.

The above-described operations of the force apply ECU 41, the lane departure alert ECU 43, and the V2V alert ECU 45 can be manually switched to the OFF state by the driver's operation. For example, the application of the force by the force apply ECU 41 changes feeling of operating to an operation system. The driver therefore can turn off the force apply ECU 41 when feeling that the application of the force by the actuators 35 and 36 is bothersome. Likewise, the lane departure alert ECU 43 and the headway distance ECU 45 tend to give a preliminary warning. The driver can therefore turn off these operations when feeling that the warning sound and the warning display are bothersome.

The travel control ECU 50 is an electronic control unit including, as its main component, a computer comprising a processor, a RAM, a memory device, an input/output interface etc. In an integrated manner, the travel control ECU 50 controls traveling of the vehicle by the processor executing a travel control program. The travel control ECU 50 is electrically connected to the drive unit 51, the automated braking device 52, the automated steering device 53, the alert device 54, the headlight 55, the direction indicator 56 etc.

The drive unit 51 is configured to include an engine, a transmission, a motor generator etc. The drive unit 51 generates a driving force for driving the vehicle. The automated braking device 52 applies a braking force to the vehicle based on the detection results of the front camera 29, the front/rear sensor 31, the V2V distance sensor 38 etc. without depending on the braking operation of the driver. The automated steering device 53 performs steering control of the steering so that the vehicle travels along the lane. The alert device 54 calls for attention, alerts, and warns the driver with a warning sound or a warning display. The headlight 55 is an illumination device installed so as to face the heading direction of the vehicle. The direction indicator 56 is a device that informs the surroundings about the moving direction of the vehicle in cases of right and left turns and/or course changes.

The travel control ECU 50 described above has a lane departure prevention function and a road departure prevention function, and makes it possible to perform substantially-autonomous traveling. Based on the integrated ECU 100 determining an occurrence of the driving difficulty state, the travel control ECU 50 causes the vehicle to gradually decelerate and stop at a particular space by cooperative control of the drive unit 51, the automated braking device 52, and the automated steering device 53. In addition, at the time of occurrence of the driving difficulty state, the travel control ECU 50 uses the alert device 54 and the direction indicator 56 to alert vehicles traveling around.

The integrated ECU 100 is an electronic control unit having a function of determining that the driver driving the vehicle is in the driving difficult state. The integrated ECU 100 detects a driver abnormality, a driving operation abnormality, and a vehicle state abnormality in order for the determination of the driving difficult state. The driver abnormality is an abnormality in the state of the driver except in his or her driving operation, and is detected based on the image captured by the driver camera 28. The driving operation abnormality is an abnormality regarding driving operation actions of the driver, and is detected based mainly on the operation information of respective pedals and steering. The vehicle state abnormality is an abnormality in the vehicle behavior and traveling state occurring as a result of the driver's driving operation, and is detected based mainly on the vehicle speed information or the vehicle-outside cameras 29 and 30.

The integrated ECU 100 mainly comprises a control circuit 60 including a processor unit 61, a RAM 62, a memory device 63, and an input/output interface. The processor unit 61 may include a GPU (Graphics Processing Unit) etc. in addition to including a CPU (Central Processing Unit). Further, the processor unit 61 may be provided with an FPGA (Field-Programmable Gate Array), an accelerator dedicated to learning and inference of AI (Artificial Intelligence), or the like.

The memory device 63 stores various programs executed by the processor unit 61. A plurality of programs stored in the memory device 63 include a state determination program for performing dead-man determination. By the processor unit 61 executing the state determination program, the integrated ECU 100 implements a driver abnormality detection unit 71, a complementary abnormality detection unit 72, and a dead-man determination unit 75 and the like as functional units.

The driver abnormality detection unit 71 detects driver abnormality items based mainly on the image analysis of the face image of the driver captured by the driver camera 28. Such the driver abnormality items include abnormalities relating to a driving posture and abnormalities relating to biological information. Abnormalities relating to the driving operations are not included in the driver abnormality items. As the detection function for the abnormalities relating to the driving posture, the driver abnormality detection unit 71 includes a forward fall posture detection function, a lateral fall posture detection function, a rigidity posture detection function, and a steering non-grip detection function. As the abnormalities relating to biological information, the driver abnormality detection unit 71 includes a white eye detection function and a pulse wave abnormal detection function. A respective detection function executes a detection process to detect a specific driver state abnormality.

The forward fall posture detection function detects the forward fall state of the driver's posture. A head of the driver in the forward fall state has moved forward and downward while having a facing downward posture angle, as compared with a normal driving posture. The forward fall posture detection function specifies a position and a posture angle of the head by analyzing the face image of the driver camera 28, for detecting the forward fall state of the driver.

The lateral fall posture detection function detects a lateral fall state of the driver posture. The head of the driver in the lateral fall state has moved laterally and downward while having a lateral posture angle, as compared with the normal driving posture. The lateral fall posture detection function specifies a position and a posture angle of the head by analyzing the face image of the driver camera 28, for detecting the lateral fall state of the driver.

In this regard, the head of the driver may be framed out of the capture range of the driver camera 28 due to the forward fall state or the lateral fall state. This situation is identifiable based on the information of the seat belt sensor 22 and the seat surface sensor 25. The forward fall posture detection function and the lateral fall posture detection function detects the abnormality of the driver under a situation where: the driver is detected by the seat surface sensor 25; and the seat bell is pulled out extremely.

The rigidity posture detection function detects a rigidity state being a state in which the driver's body has become stiff. One example is such that the driver who is in the rigidity state due to impaired consciousness such as fainting etc. has smaller amplitude of head sway than in a normal state. The rigidity posture detection function analyzes the behavior of the head by analyzing the face image of the driver camera 28, for detecting the rigidity state of the driver.

The steering non-grip detection function detects a non-grip state of the steering wheel. The non-grip detection function analyzes the detection signal of the steering grip state sensor 33 to determine whether or not the driver's grip state of the steering wheel corresponds to a grip state that is predefined as being normal. As the non-grip state of the steering wheel, the non-grip detection function detects a case where the present grip state deviates from the normal grip state.

The white-eye detection function detects the driver rolling his or her eye back. In the state of rolling one's eye back, an apparent oblateness of the black eye region increases. The white eye detection function calculates the oblateness of the black eye region by image analysis of the driver camera 28, and detects the white eye state in response to a specific threshold being exceeded.

The pulse wave abnormality detection function detects an abnormality in the pulse wave of the driver. The pulse wave is propagation of arterial pressure waves caused by pumping actions of the heart. There is a correlation between a time it takes the pulse wave to propagates through a blood vessel (pulse wave transit time) and a blood pressure fluctuation. Therefore, it is possible to estimate abnormal blood pressure fluctuation of the driver based on the pulse wave. Based on brightness information extracted from the face image of the driver camera 28, the pulse wave abnormality detection function monitors the state associated with the pulse wave of the driver, and eventually the blood pressure, for detecting the abnormality from the deviation from a normal value.

The driver abnormality detection unit 71 may detect an abnormality in the heart rate, an abnormality in breathing etc. as the abnormalities associated with the biological information. One example is such that the heart rate may be grasped using a detection signal from the steering grip state sensor 33 built in the steering wheel. The breathing state may be grasped by a process of analyzing the change in the detection signal of the seat surface sensor 25.

The complementary abnormality detection unit 72 detects the above-described driving operation abnormality and vehicle state abnormality as abnormality items that are not included in the driver abnormality. The complementary abnormality detection unit 72 may perform an abnormality detection process based on the information acquired from the vehicle-mounted device 20 and may perform an abnormality detection process using a detection signal that is output from a respective ECU 41, 43, 45 described above and that is indicative of an abnormal operation or an abnormal traveling. The complementary abnormality detection unit 72 is configured to include an operation abnormality detection unit 73 and a traveling abnormality detection unit 74.

The operation abnormality detection unit 73 detects driving operation abnormality items. In response to the driver abnormality detection unit 71 detecting an abnormality in the driver state, the operation abnormality detection unit 73 starts detection processing for detecting an abnormality in driving operation. A plurality of abnormal operations are specified in advance as these driving operation abnormality items. The operation abnormality detection unit 73 has a plurality of detection functions each capable of executing a detection process for detecting a specific abnormal operation.

Specifically, the operation abnormality detection unit 73 has a steering wobbly input detection function, a steering input force drop detection function, a brake input amount abnormality detection function, a visual fixation detection function, an accelerator input abnormality detection as detection functions for driving operation abnormality items. In addition, the operation abnormality detection unit 73 can detect decreases in the operation force of the accelerator pedal and the brake pedal as abnormal operations by acquiring the detection result by the pedal operation force decrease detection function of the force apply ECU 41.

The steering wobbly input detection function detects a wobbly operation input by the driver. The wobbly operation is an operation of periodically changing the position of the vehicle to the right and the left in the lane. The steering wobbly input detection function analyzes an amount of operation to the steering wheel from the information of the steering angle sensor 27 etc. and detects the wobbly operation of the driver.

The steering operation force drop detection function detects a decrease in stability of the steering operation input to the steering wheel by the driver based on the information from the vehicle speed sensor 21, the steering angle sensor 27, and the like. Specifically, a current steering angle given on assumption that the steering is smoothly performed while traveling at a constant vehicle speed is estimated and an error between the estimated value and a current actual value is calculated by the steering operation force drop detection function. Then, when distribution of errors diverges and the steering operation is stepwise, the steer operating force drop detection function detects a decrease in the steering operating force.

The brake operation amount abnormality detection function detects an abnormality in the brake operation input to the brake pedal by the driver based on information from the vehicle speed sensor 21, the front camera 29, the front/rear sensor 31, the brake sensor 34, and the like. The brake operation amount abnormality detection function learns normal operation speed of the brake operation in association with the vehicle speed and the V2V distance. The brake operation amount abnormality detection function detects an abnormal state of the brake operation when the brake operation speed detected by the brake sensor 34 deviates from the learned normal brake operation speed.

The visual fixation detection function specifies the visual position of the driver based on the information from the front camera 29, the driver camera 28 etc. for detecting the visual fixation as an abnormality. Specifically, the visual fixation detection function detects a contour of the eye and the center position of the black eye from the face image by the driver camera 28, and detects, from a positional relationship between these, a line-of-sight direction. Then, when the line of sight does not follow an object captured by the front camera 29, the visual fixation detection function detects the fixation of the visual movement.

The accelerator operation abnormality detection function detects, as an abnormality, an unnatural accelerator operation such as continuation of pressing the accelerator pedal, based on information from the vehicle speed sensor 21, the accelerator sensor 26, the front/rear sensor 31 etc. One example is such that in each of the normal operation state and the abnormal operation state, the accelerator operation abnormality detection function predicts the accelerator opening at the next time, and compares the accelerator opening actually detected at the next time with a respective estimated value. As a result of such comparison, when the actual accelerator opening is closer to the estimated value of the abnormal operation state than the estimated value of the normal operation state, the accelerator operation abnormality detection function detects an abnormality in the accelerator operation.

The traveling abnormality detection unit 74 detects abnormal vehicle state items. When the operation abnormality detection unit 73 detects an abnormality in the driving operation, the traveling abnormality detection unit 74 starts detection processing for detecting an abnormality in the traveling state. As such vehicle state abnormality items, a plurality of abnormal traveling states are defined in advance. The traveling abnormality detection unit 74 has a plurality of detection functions each capable of executing detection processing for detecting a specific abnormal vehicle traveling.

Specifically, as detection functions for the vehicle state abnormality items, the traveling abnormality detection unit 74 includes a vehicle travel direction swing detection function, a long-time over-speed detection function, an on-highway abnormal low speed detection function, a collision detection function etc. Further, the traveling abnormality detection unit 74 is capable of detecting these abnormal travelings by obtaining the detection results by the lane marker across detection function of the lane departure alert ECU 43 and the detection result by the short V2V distance continuation detection function of the V2V alert ECU 45.

The vehicle heading direction swing detection function extracts an acceleration component in the traveling direction of the vehicle from the detection result of the G sensor 24, and calculates jerk by first-order differentiating the acceleration. Then, the number of times an absolute value of the jerk becomes a certain value (for example, 10 m/s^3) or more is counted, and the swing detection function detects an abnormality in response to, within a predetermined time, counting a certain number of times (for example, 4 times per 5 s) or more.

The long-time over-speed detection function acquires a speed limit of the road on which the vehicle is currently traveling from the navigation device 23. When a state in which a difference between the vehicle speed indicated by the vehicle speed sensor 21 and control speed is equal to or greater than a certain value (for example, 20 km/h) continues for a certain time (for example, 5 s) or more, the over-speed detection function detects there is abnormal.

The abnormal low speed detection function for on-highway extracts, from the map data provided by the navigation device 23, information as to whether or not the currently traveling road is a highway. Then, when traveling on the highway, the abnormal low speed detection function detects an abnormal low speed state using the vehicle speed indicated by the vehicle speed sensor 21. On example is such that when the state of being below a certain value (for example, 60 km/h) continues for a certain time (for example, 5 s) or more, the abnormal low speed detection function detects there is an abnormality.

As an abnormality, the collision detection function detects a rapid change in acceleration indicative of an occurrence of a collision based on the information from the G sensor 24.

The dead-man determination unit 75 determines the driving difficulty state (dead-man) of the driver by a process of fusion of the detection results of the driver abnormality detection unit 71 and the complementary abnormality detection unit 72. The dead-man determination unit 75 sequentially performs detection for the driver abnormality items by the driver abnormality detection unit 71, detection for driving operation abnormality items by the operation abnormality detection unit 73, and detection for the vehicle state abnormality items by the traveling abnormality detection unit 74. Then, in response to detecting both an abnormal driving operation item and an abnormal vehicle state item in addition to detecting an abnormal driver item, the dead-man determination unit 75 determines that the driver is in a driving difficult state. In other words, the dead-man determination unit 75 does not determine that the vehicle is in a driving difficult state, in response to only detecting the abnormal state of the driver abnormality item alone. In cases where the abnormal items of the three kinds are not detected in a specific order, the dead-man determination unit 75 does not determine that there is the driving difficulty also.

The dead-man determination unit 75 first operates only the detection function for the driver abnormality items, and in response to detecting an abnormality, operates the detection function for a driving operation abnormality item that has a causal relationship (association) with content of the detected abnormality. Further, when an abnormality in the driving operation is detected, the dead-man determination unit 75 operates the detection function for an traveling state abnormal item that has a causal relationship (association) with the detected abnormal operation.

Figure 3:
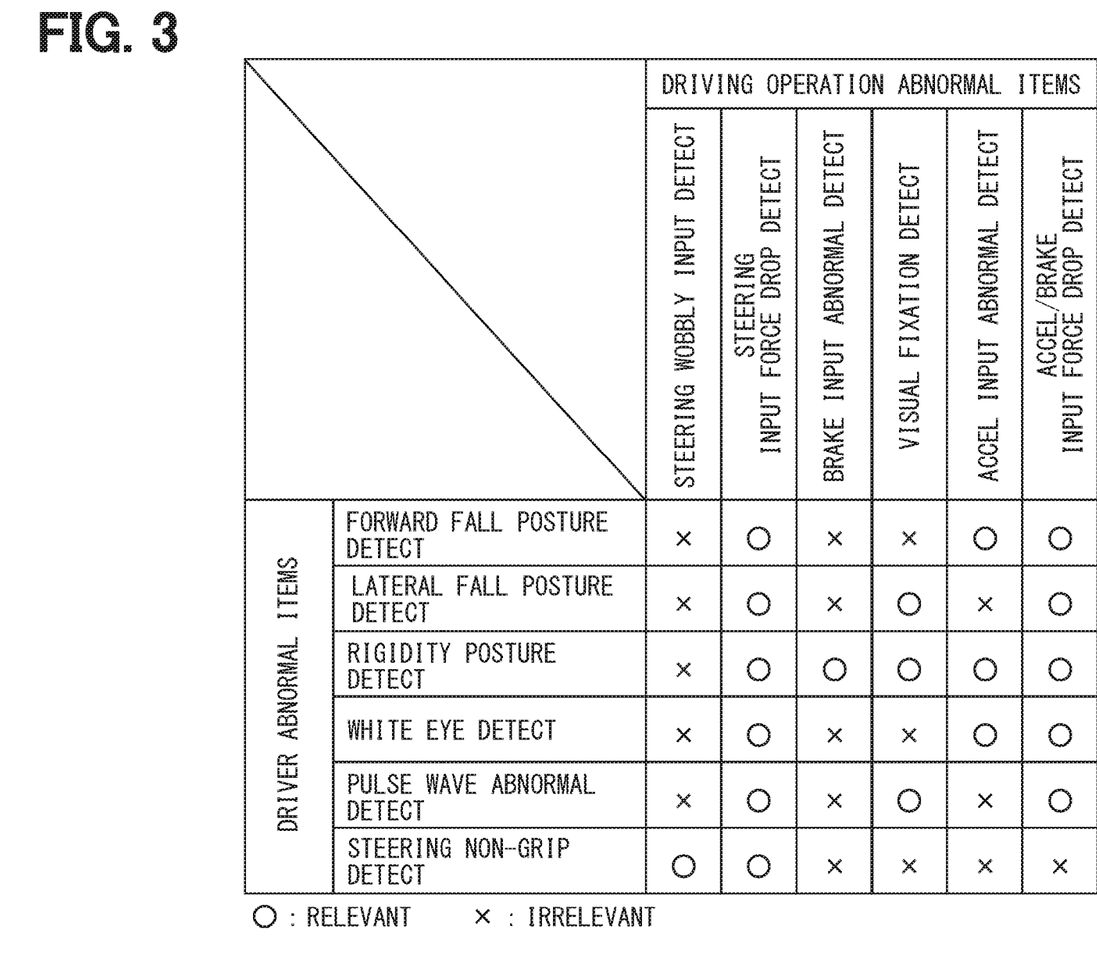
FIG. 3 is a diagram illustrating details of a first association matrix showing association among driver abnormality items and driving operation abnormality items.
Figure 4:
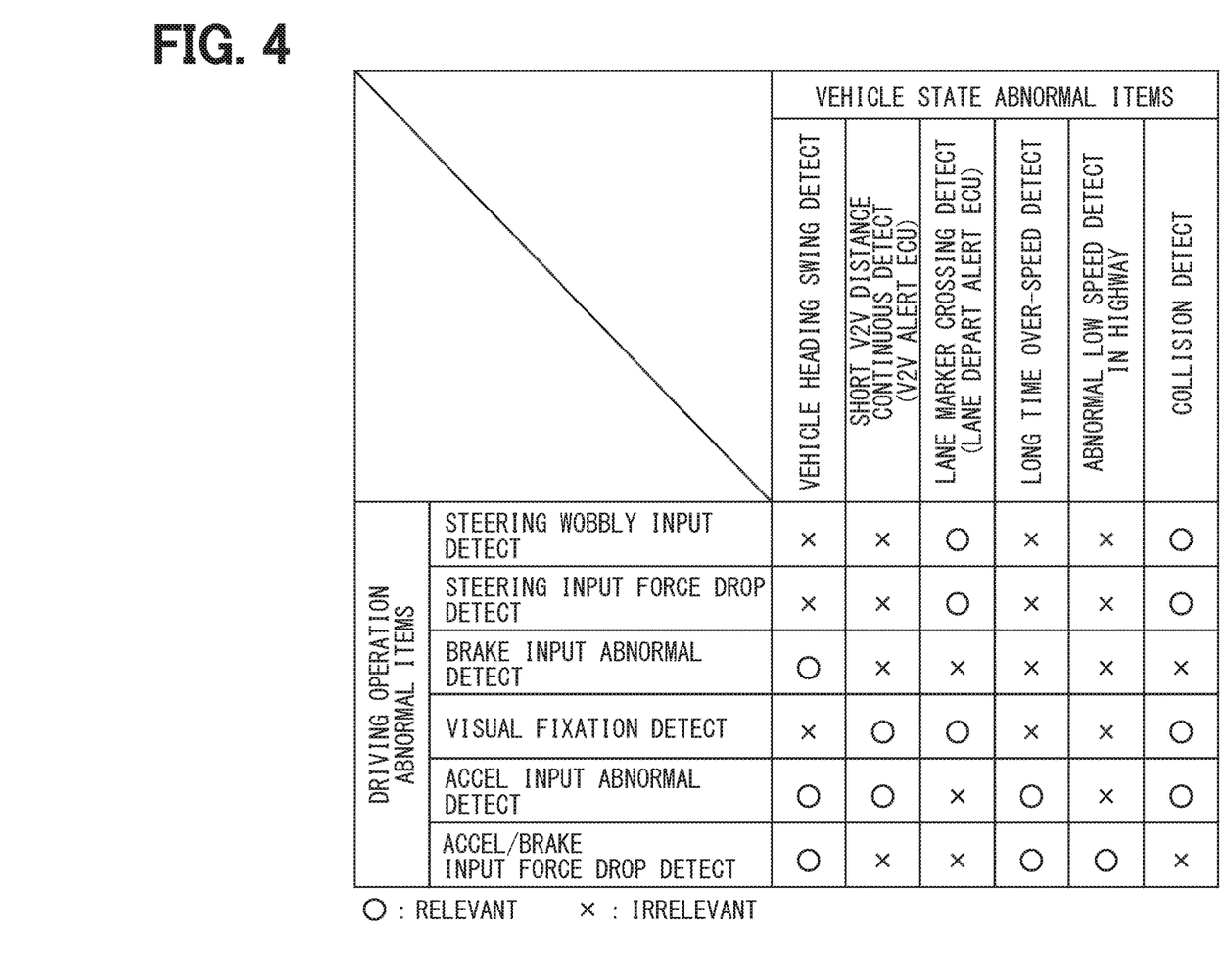
FIG. 4 is a diagram illustrating details of a second association matrix showing association among abnormal driving operation items and abnormal traveling state items.

The detection functions for respective abnormal items are associated with each other by, for example, an association matrix shown in FIGS. 3, 4. More specifically, in a first association matrix shown in FIG. 3, a respective abnormal item of the driver abnormal items is associated with, of the driving operation abnormal items, at least one abnormal item that has an assumed causal relationship with it. When a driver abnormality is detected, the operation abnormality detection unit 73 starts detection process for an abnormal operation that is associated with the detected abnormality content from among a plurality of predefined abnormal operations.

One example is such that the forward fall posture detection is associated with the accelerator operation abnormality detection and the pedal operation force drop detection. The lateral fall posture detection is associated with the steering wobbly operation detection, the accelerator operation abnormality detection, and the pedal operation force drop detection. The rigidity posture detection is associated with the steering operation force drop detection, the brake operation amount abnormality detection, the visual fixation detection, the accelerator operation abnormality detection function, and the pedal operation force reduction detection. The white eye detection is associated with the steering operation force drop detection, the accelerator operation abnormality detection, and the pedal operation force drop detection. The pulse wave abnormality detection is associated with the steering operation force drop detection, the visual fixation detection, the accelerator operation abnormality detection, and the pedal operation force drop detection. The steering non-grip detection is associated with the steer wobbly operation detection and the steering operation force drop detection.

In the second association matrix shown in FIG. 4, a respective abnormal item of the abnormal driving operation items is associated with, of the vehicle state abnormal items, at least one or more abnormal item having a causal relationship with it. When a driving operation abnormality is detected, the traveling abnormality detection unit 74 starts detection process for, from among a plurality of predefined abnormal travelings, an abnormal traveling that is associated with the detected abnormal operation.

One example is such that the lane marker across detection and the collision detection are associated with the steering wobbly operation detection and the operation force drop detection. The brake operation amount abnormality detection is associated with the vehicle heading direction swing detection. The visual fixation detection is associated with the short V2V distance continuation detection, the lane marker across detection, and the collision detection. The accelerator operation abnormality detection is associated with the vehicle heading direction swing detection, the short V2V distance continuation detection, the long-time over-speed detection, and the collision detection. The pedal operation force drop detection is associated with the vehicle heading direction swing detection, the long-time over-speed detection, and the on-highway abnormal low speed detection.

As shown in FIGS. 1 and 2, the dead-man determination unit 75 controls, in an integrated manner, start and stop of each detection function of the driver abnormality detection unit 71 and the complementary abnormality detection unit 72. The dead-man determination unit 75 basically keeps the activated state of each driver abnormality item detection function of the driver abnormality detection unit 71. In contrast, a respective detection function of the complementary abnormality detection unit 72 is basically stopped, and is activated by the dead-man determination unit 75 at a required timing.

In addition, the force apply ECU 41, the lane departure alert ECU 43, and the V2V alert ECU 45 that are in a stopped state can be individually activated by the dead-man determination unit 75. As described above, the ECUs 41, 43, 45, which are external to the integrated ECU 100, can be stopped by the driver's operation. When a driver abnormal item or a driving operation abnormal item is detected, the dead-man determination unit 75 forcibly activates a necessary ECU from among the ECUs 41, 43, 45 in the stopped state.

When the driver abnormality detection unit 71 detects a driver abnormality item, the dead-man determination unit 75 refers to the first association matrix (see FIG. 3) and selectively activates a detection function for an abnormal operation that is associated with the detected abnormality content from among the plurality of abnormal operations. Furthermore, when the operation abnormality detection unit 73 detects a driving operation abnormality item, the dead-man determination unit 75 refers to the second association matrix (see FIG. 4) and selectively activates the detection function for an abnormal traveling that is associated with the detected abnormal operation from among the plurality of abnormal travelings. In a manner similar to activating the detection functions of the operation abnormality detection unit 73 and the traveling abnormality detection unit 74, the dead-man determination unit 75 activates the detection function of each of 41, 43, and 45 external thereto. In addition, the dead-man determination unit 75 performs a process of raising the priority of execution by the processor unit 61 of each detection function of the operation abnormality detection unit 73 and the traveling abnormality detection unit 74. A respective detection function of the operation abnormality detection unit 73 and the traveling abnormality detection unit 74 transitions to a stopped state in response the detection process being ended.

The dead-man determination processing executed by the integrated ECU 100 described above will be described in details based on FIG. 5 and with reference to FIGS. 1 and 2. The dead-man determination processing shown in FIG. 5 starts, for example, in response to ignition of the vehicle being switched to an ON state, and is repeated until the ignition is turned off.

Figure 5:
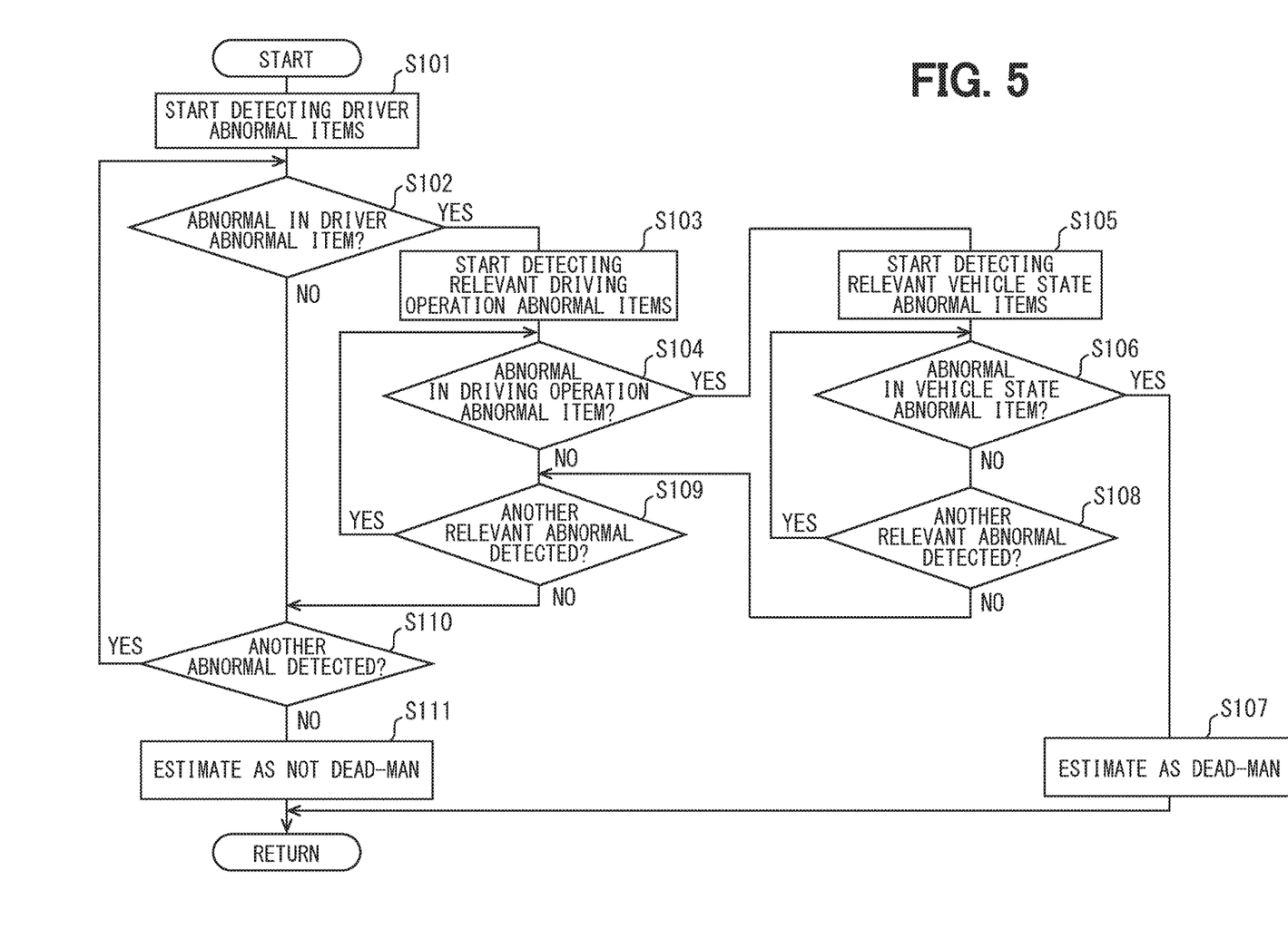
FIG. 5 is a flowchart illustrating details of dead-man determination processing.

In S101, the detection for abnormal driver items is started, and the processing proceeds to S102. In S101, for example, the plurality of detection functions of the driver abnormality detection unit 71 sequentially perform detection processes. In S102, it is determined whether or not an abnormality among the driver abnormality items is detected by the detection process executed in S101. When it is determined in S102 that there is no driver abnormality item detected, the processing proceeds to S110. When it is determined in S102 that there is an abnormal driver item detected, the processing proceeds to S103.

In S103, referring to the first association matrix (see FIG. 3), the detection process for a driving operation abnormality item that is associated with the abnormality content of the driver abnormality item detected at S101 is started, and the processing proceeds to S104. In S104, it is determined whether or not an abnormality among the driving operation abnormality items is detected. When it is determined in S104 that there is no abnormal driving operation item detected, the processing proceeds to S109. When it is determined in S104 that there is an abnormal driving operation item detected, the processing proceeds to S105.

In S105, referring to the first association matrix (see FIG. 4), the detection process for the vehicle state abnormal item (see FIG. 4) that is associated with the abnormal operation of the abnormal driving operation item detected in S103 is started and the processing proceeds to S106. In S106, it is determined whether or not an abnormality among the vehicle state abnormality items is detected. When it is determined in S106 that there is no vehicle state abnormality item detected, the processing proceeds to S108. When it is determined in S106 that there is a vehicle state abnormal item detected, the processing proceeds to S107. In S107, an estimation for the driver's driving difficulty state, that is, the dead man, is performed.

In S108, it is determined whether or not there is another detection process for a vehicle state abnormality item that is associated with the abnormal operation. When it is determined in S108 that there is no other detection process for the associated vehicle state abnormality item, the processing proceeds to S109. On the other hand, when it is determined in S108 that there is another detection process for the associated vehicle state abnormality item, this detection process is executed and the processing returns to S106. Then, when abnormal traveling is detected in S106, it is estimated as a dead man in S107.

In S109, it is determined whether or not there is another process for detecting an abnormal operation item associated with the abnormality content. When it is determined in S109 that there is no other detection process for the associated driving operation abnormality item, the processing proceeds to S110. In contrast, when it is determined in S109 that there is another detection process for the associated riving operation abnormality item, the detection process is executed, and the processing returns to S104. Then, when the abnormal operation is detected in S104, the processing proceeds to S105.

In S110, it is determined whether or not there is another driver abnormality item detection process not executed yet. When it is determined in S110 that there is another driver abnormality item detection process, the detection process is executed, and the processing returns to S102. In contrast, when it is determined in S110 that there is no other driver abnormality item detection process, the processing proceeds to S111. In S111, it is estimated as the normal state of the driver, that is, the non-dead-man.

Detecting the driver abnormality item alone does not allow the dead-man determination unit 75 of the present embodiment described above to determine that the vehicle is in a driving difficult state. The dead-man determination unit 75 determines that the driver is in a driving difficult state in response to detecting a driver operation abnormality item and a vehicle state abnormality item in addition to detecting the driver abnormality item. According to the above, a situation in which a posture collapse or the like of the normal state driver is confused with a driving difficulty state is unlikely to occur. Therefore, erroneous detection of a driving difficult state can be reduced.

In addition, in the present embodiment, both an abnormality in the driving operation and an abnormality in the vehicle state are detected. Mere detecting of the abnormalities in the three groups does allow the dead-man determination unit 75 to determine that the vehicle is in a driving difficult state; rather, the dead-man determination unit 75 determines that the vehicle is in a driving difficult state on condition that the driver abnormality item, the driving operation abnormality item and the vehicle state abnormality item are detected in an assumed order.

According to the determination method as described above, the erroneous detection of the driving difficult state is more difficult to occur.

Further, in the present embodiment, based on the detected abnormality content of the driver abnormality item, the driving operation abnormality item detection function associated with this abnormality content is activated. In addition, in the present embodiment, based on the detected abnormal operation of the abnormal driving operation item, the detection function for the vehicle state abnormality item associated with this abnormal operation is activated. Selectively executing only the detection functions having a causal relationship in the above manner avoids executing another detection process that likely causes erroneous detection. Therefore, the accuracy of determining the driving difficult state can be further improved. Furthermore, when the detection function that does not contribute to improvement in the determination accuracy remains stopped, it is possible to reduce power consumption of the integrated ECU 100 and perform an important detection process preferentially. It is alternatively possible to set performance required for the integrated ECU 100 to low.

Further, the dead-man determination unit 75 of the present embodiment can forcibly start each of the external ECUs 41, 43, 45 in a stopped state based on the detection results of the driver abnormality detection unit 71 and the operation abnormality detection unit 73. Therefore, even if every detection function is turned off by the driver, it is possible to avoid a situation in which the detection result is unobtainable from each ECU 41, 43, 45. According to the above, at a time when the driver is abnormal, the dead-man determination can be appropriately performed even by the integrated ECU 100 determining the driving difficulty state using the detection function of each of the external ECUs 41, 43, 45. Further, by effectively utilizing calculation resources of the external ECUs 41, 43, 45, it is possible to reduce calculation processing resources required for the integrated ECU 100 while ensuring the accuracy in determining the driving difficult state.

In the above embodiment, the force apply ECU 41, the lane departure alert ECU 43, and the V2V alert ECU 45 correspond to "abnormality detection devices", respectively. Further, the control circuit 60 corresponds to a "processing unit", the dead-man determination unit 75 corresponds to an "integrated determination unit", and the integrated ECU 100 corresponds to a "state determination device".

Other Embodiments

Although one embodiment according to the present disclosure has been described above, the present disclosure is not construed as being limited to the above embodiment, and it is possible to apply to various embodiments and combinations without departing from the scope and spirt of the present disclosure.

In the above embodiment, the detection process is performed in the order of the driver abnormality, the driving operation abnormality, and the vehicle state abnormality. However, for example, the detection process for the abnormal driving operation item and the detection process for the vehicle state abnormality item may be performed concurrently with the detection process for the driver abnormality item. As a result of this, a temporal order of these abnormality detections may be interchanged. One example is such that the state determination device may determine the driving difficulty state even when the driving operation abnormality and the vehicle state abnormality are detected substantially at the same time.

Further, the state determination device may determine the driving difficulty state based on, for example, a driver abnormality such as posture collapse and on one of a driving operation abnormality or a vehicle state abnormality.

For example, in a first modification of the above-described embodiment, the complementary abnormality detection unit substantially has the detection function for the abnormal driving operation items only. In the dead-man determination processing of the first modification shown in FIG. 6, when a driver abnormality is detected (S202: YES), a driving operation abnormality item detection process is performed (S203). Then, when the driving operation abnormality is further detected (S204: YES), it is estimated that the driver is a dead man (S205).

Further, in a second modification of the above-described embodiment, the complementary abnormality detection unit substantially has the vehicle state abnormality item detection function only. In the dead-man determination processing of the second modification shown in FIG. 7, when a driver abnormality is detected (S302: YES), a detection process for a vehicle state abnormality item is performed (S303). Then, when the vehicle state abnormality is also detected (S304: YES), it is estimated that the driver is a dead man (S305).

Furthermore, in a third modification of the above-described embodiment, the complementary abnormality detection unit has the driving operation abnormality item detection function and the vehicle state abnormality detection function without distinction. In the dead-man determination processing of the third modification, when a driver abnormality is detected, the complementary abnormality detection unit performs the detection process for a complementary abnormality item not included in the driver abnormality. Then, when another abnormality is further detected, it is estimated that the driver is a dead man.

Figure 6:
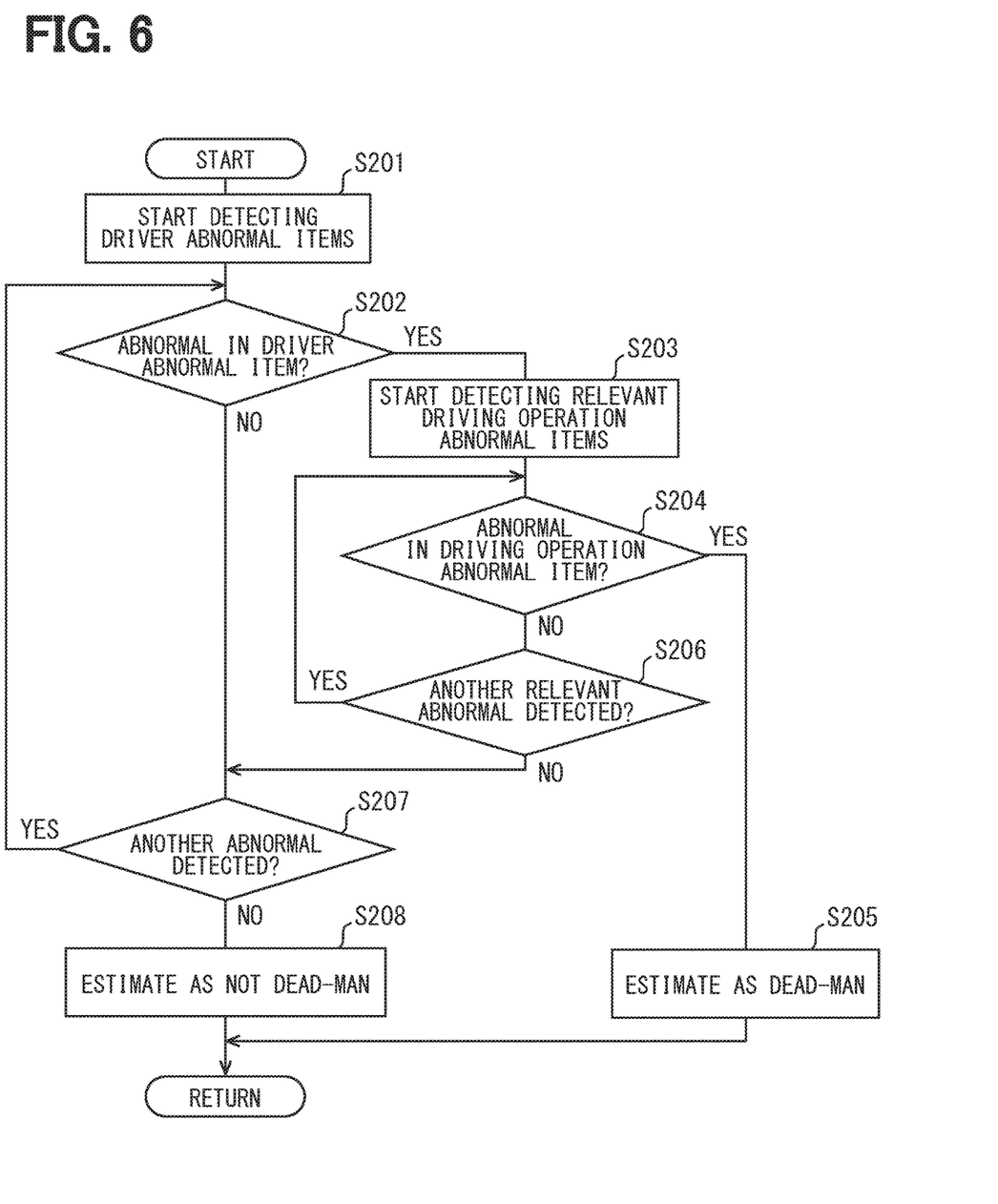
FIG. 6 is a flowchart illustrating details of dead-man determination processing in a first modification.
Figure 7:
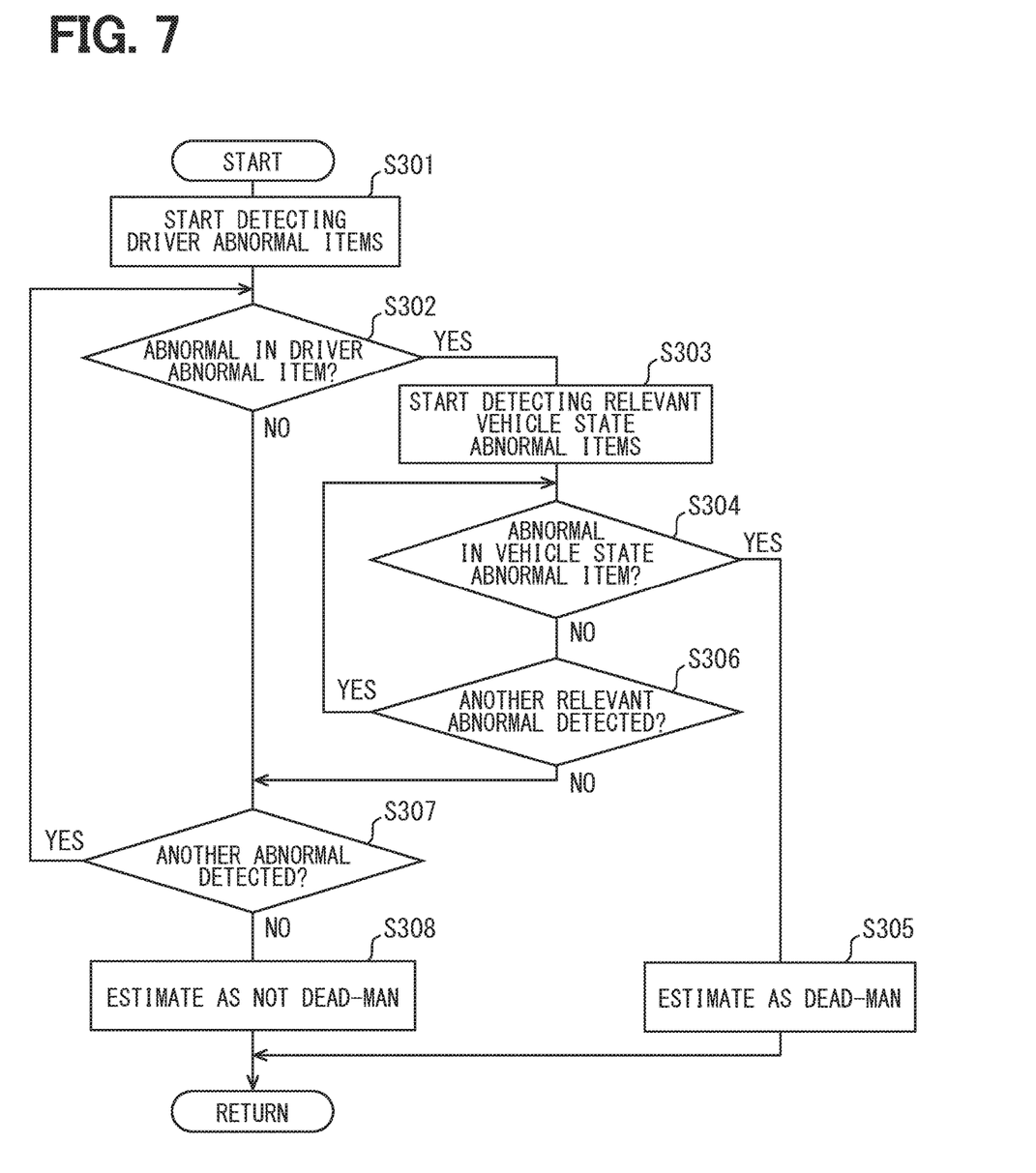
FIG. 7 is a flowchart illustrating details of dead-man determination processing in a second modification.

Note that S201, S206, S207, and S208 in the first modification are substantially the same as S101, S109, S110, and S111 of the above-described embodiment. Moreover, S301, S306, S307, and S308 in the second modification are substantially the same as S101, S108, S110, and S111 of the above-described embodiment.

The driver abnormality detection unit, the operation abnormality detection unit, and the traveling abnormality detection unit may have not all the detection functions described in the above embodiment. The driver abnormality detection unit, the operation abnormality detection unit, and the traveling abnormality detection unit may each have at least one detection function. Further, the operation abnormality detection unit and the traveling abnormality detection unit may be configured to simply acquire the detection result of the external ECU and perform the detection based on the detection result. In this way, the cooperation with the external ECU is strengthened and the processing in the integrated ECU is specialized for the detection process for the driver abnormality item, further enabling achievement of both processing optimization and accuracy improvement.

At least part of the detection functions described in the above embodiment may detect specific driver abnormality, driving operation abnormality, and vehicle state abnormality using a learning model learned by machine learning. By using such a learning model, it is possible to improve the accuracy in a respective individual detection function. In addition, the detection using the learning model tends to consume resources of the processor unit. Therefore, an effect of reducing consumption resources by suspending the detection function is further exerted.

In the above embodiment, the detection functions of the driver abnormality detection unit are basically in the activated state. However, the dead-man determination unit may start and stop a respective detection function of the driver abnormality detection unit on an as-needed basis. The dead-man determination unit may maintain at least part of the detection functions of the complementary abnormality detection unit at the activated state. In this case, the dead-man determination unit perform control to raise, on an operating system for example, execution priority of this detection processing task of the detection function as needed.

In the above embodiment, only the detection processes associated with the detected abnormal items are selectively activated based on the two association matrices. However, the dead-man determination unit may perform the detection processes for all of the driving operation abnormality items regardless of the detected abnormality content of the state of the driver. Similarly, the dead-man determination unit may perform the detection processes for all of the vehicle state abnormality items regardless of the detected abnormal operation of the driver. Further, in an association matrix, items of the vehicle abnormality group may be associated with items of the driver abnormality group. Further, items associated with each other in the association matrix may be appropriately changed according to a story that is the grounds for assuming the causal relationship.

The integrated ECU of the above-described embodiment can forcibly start the external ECUs in the stopped state. However, at least part of the external ECUs may not be forcibly activated by the integrated ECU. Furthermore, for the dead-man determination, the integrated ECU can use the detection results of various electronic control units mounted to the vehicle and detection results of a mobile terminal and a wearable device possessed by the driver. Alternatively, the integrated ECU may be able to perform all of the detection processes by the control circuit of the integrated ECU.

A respective function of the state determination device provided by the integrated ECU in the above embodiment may be provided by, for example, a control unit of the driver camera. Specifically, the control unit of the driver camera may be a processing unit that executes the state determination program. Further, a respective function of the state determination device may be provided by a control unit dedicated to dead-man determination instead of the integrated ECU. Furthermore, a plurality of ECUs may cooperate to implement respective functions of the state determination device.

Each of the above functions can be provided by software and hardware that executes the software, only software, only hardware, or combinations thereof. Further, when such a function is provided by an electronic circuit being hardware, each function can also be provided by a digital circuit including a large number of logic circuits or by an analog circuit.

In the above embodiment, various non-transitory tangible storage media are usable as a memory device that stores the state determination program. Forms of such a storage medium may be appropriately changed. For example, the storage medium may be in the form of a memory card or the like, and may be configured to be inserted into a slot portion provided in a seat air conditioning ECU and electrically connected to the control circuit. In addition, a storage medium that stores the state determination program is not limited to a storage medium configured to be mounted to a vehicle, and may be an optical disk that is an original of copy to the storage medium, a hard disk drive of a general-purpose computer etc.

Controllers and methods described in the present disclosure may be implemented by a special purpose computer created by configuring a memory and a processor programmed to execute one or more particular functions embodied in computer programs. Alternatively, controllers and methods described in the present disclosure may be implemented by a special purpose computer created by configuring a processor provided by one or more special purpose hardware logic circuits. Alternatively, controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

Herein, a flowchart or processes in the flowchart described in the present application is configured with of a plurality of sections (or referred to as steps), and each section is expressed as, for example, S101. Further, each section can be divided into multiple subsections, while multiple sections can be combined into one section. Further, each section configured in this way can be referred to as a device, module, means.

While the invention has been described above with reference to various embodiments thereof, it is to be understood that the invention is not limited to the above described embodiments and construction. In addition, various combinations and forms, and other combinations and forms, including only a single element, more, or less elements, are also within the spirit and scope of the present disclosure.

The invention claimed is:

1. A state determination device to determine that a driver who is driving a vehicle is in a driving difficult state, comprising:
   a driver abnormality detection unit that detects an abnormality in a state of the driver;
   an operation abnormality detection unit that detects an abnormality in a driving operation input by the driver;
   a traveling abnormality detection unit that detects an abnormality in a traveling state of the vehicle; and
   an integrated determination unit that, in response to only the driver abnormality detection unit detecting the abnormality in the state of the driver alone, does not determine that the driver is in the driving difficult state but determines that the driver is in the driving difficult state in response to: the driver abnormality detection unit detecting the abnormality in the state of the driver; thereafter the operation abnormality detection unit detecting an abnormal operation; and thereafter the traveling abnormality detection unit detecting an abnormal traveling.

2. The state determination device according to claim 1, wherein:
   in response to detecting the abnormality in the state of the driver, the operation abnormality detection unit starts a detection process for, from among a plurality abnormal operation items predefined for the driving operation, an abnormal operation that is associated with an abnormality content detected by the driver abnormality detection unit.

3. The state determination device according to claim 1, wherein:
   in response to detecting the abnormality in the driving operation, the traveling abnormality detection unit starts a detection process for, from among a plurality of abnormal traveling items predefined for the traveling state, an abnormal traveling that is associated with the abnormal operation detected by the operation abnormality detection unit.

4. The state determination device according to claim 1, wherein:
   the integrated determination unit: activates a detection function for the abnormal travel item associated with the abnormal operation detected by the operation abnormality detection unit; or raises an execution priority of the detection function in the traveling abnormality detection unit.

5. The state determination device according to claim 1, wherein:
   the integrated determination unit: activates a detection function for the abnormal operation item that is associated with the abnormality content detected by the driver abnormality detection unit; or raises an execution priority of the detection function in the operation abnormality detection unit.

6. The state determination device according to claim 1, wherein:

the traveling abnormality detection unit acquires a detection signal indicating an abnormal operation output from an abnormality detection device mounted to the vehicle, and uses the detection signal to detect the abnormal operation; and the integrated determination unit acquires a detection signal indicating abnormal traveling output from the abnormality detection device, and uses the detection signal to detect the abnormal traveling.

7. The state determination device according to claim 6, wherein:

an operation of the abnormality detection device is stoppable by the driver; and in response to the driver abnormality detection unit detecting the abnormality in the state of the driver, the integrated determination unit activates the abnormality detection device in a stopped state.

8. A state determination method performed by at least one processing unit, the method comprising:

detecting an abnormality in a state of the driver;

detecting an abnormality in a driving operation input by the driver;

detecting an abnormality in a traveling state of the vehicle; and determining that the driver is in the driving difficult state in response to: detecting the abnormality in the state of the driver; thereafter detecting an abnormal operation; and thereafter detecting an abnormal traveling, while in response to detecting the abnormality in the state of the driver alone, the method not determining that the driver is in the driving difficult state.

9. A computer readable non-transitory storage medium comprising computer-executable instructions that comprise a computer-implemented method of determining that a driver who is driving a vehicle is in a driving difficult state, the method comprising:

detecting an abnormality in a state of the driver;

detecting an abnormality in a driving operation input by the driver;

detecting an abnormality in a traveling state of the vehicle; and determining that the driver is in the driving difficult state in response to: detecting the abnormality in the state of the driver; thereafter detecting an abnormal operation; and thereafter detecting an abnormal traveling, while in response to detecting the abnormality in the state of the driver alone, the method not determining that the driver is in the driving difficult state.

* * * * *